United States Patent
Misawa et al.

(10) Patent No.: US 8,189,087 B2
(45) Date of Patent: May 29, 2012

(54) IMAGING DEVICE AND PHOTOGRAPHED IMAGE DISPLAY CONTROL METHOD

(75) Inventors: Takeshi Misawa, Miyagi (JP); Yoshikuni Nishiura, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 339 days.

(21) Appl. No.: 12/382,480

(22) Filed: Mar. 17, 2009

(65) Prior Publication Data

US 2009/0237547 A1 Sep. 24, 2009

(30) Foreign Application Priority Data

Mar. 18, 2008 (JP) ................. 2008-069452

(51) Int. Cl.
*H04N 5/222* (2006.01)
*H04N 5/225* (2006.01)

(52) U.S. Cl. .......... 348/333.02; 348/333.05; 348/333.11

(58) Field of Classification Search ............. 348/333.02, 348/333.05, 333.11, 231.2, 231.3, 231.9, 348/220.1
See application file for complete search history.

(56) References Cited

U.S. PATENT DOCUMENTS

| | | | | |
|---|---|---|---|---|
| 6,310,648 | B1 * | 10/2001 | Miller et al. | 348/333.05 |
| 6,683,649 | B1 * | 1/2004 | Anderson | 348/333.05 |
| 6,943,841 | B2 | 9/2005 | Miyake et al. | |
| 7,257,317 | B2 * | 8/2007 | Ohnishi | 386/230 |
| 7,714,926 | B2 | 5/2010 | Kobayashi et al. | |
| 2002/0064387 | A1 | 5/2002 | Miyake et al. | |
| 2003/0095191 | A1 * | 5/2003 | Saito | 348/220.1 |
| 2004/0239686 | A1 * | 12/2004 | Koyama et al. | 345/620 |
| 2007/0188646 | A1 * | 8/2007 | Kobayashi et al. | 348/333.11 |

FOREIGN PATENT DOCUMENTS

| | | |
|---|---|---|
| JP | 2002-165116 | 6/2002 |
| JP | 2005-328243 A | 11/2005 |
| JP | 2010-503082 A | 1/2010 |
| WO | WO 2008/030779 A2 | 3/2008 |

OTHER PUBLICATIONS

Japanese Office Action dated Nov. 10, 2011 with an English translation.

* cited by examiner

*Primary Examiner* — David Ometz
*Assistant Examiner* — Carramah J Quiett
(74) *Attorney, Agent, or Firm* — McGinn IP Law Group, PLLC (57) ABSTRACT

Usually, reduced images of past photographed images are displayed with a live view image. When a still image is photographed, the photographed image (post-view image) is displayed, and then an animation that allows a user to intuitively recognize that the image has been successfully photographed and the photographed image has been saved is displayed. Accordingly, a user of an imaging device can intuitively recognize that a photographed image has been successfully saved, and photograph a next image without performing any special operation on a camera.

16 Claims, 11 Drawing Sheets

STATE A

DISPLAY LIVE VIEW IMAGE

FULL PRESS RELEASE BUTTON ⇨

STATE B

DISPLAY PHOTOGRAPHED IMAGE

AFTER DISPLAY ⇨

STATE C

DISPLAY ANIMATION SHOWING THAT NEWLY PHOTOGRAPHED IMAGE IS ADDED TO ALREADY PHOTOGRAPHED IMAGES

| GROUP NAME | IMAGES FOR EACH GROUP |
|---|---|
| A | $A_1, A_2, A_3 \cdots A_n$ |
| B | $B_1, B_2, B_3 \cdots$ |
| C | $C_1, C_2, C_3 \cdots$ |
| $\cdots$ | |

IMAGING DEVICE AND PHOTOGRAPHED IMAGE DISPLAY CONTROL METHOD

BACKGROUND OF THE INVENTION

1. Field of the Invention

The present invention relates to an imaging device and a photographed image display control method, and more particularly to a technique for informing a user that an image has been photographed and saved.

2. Description of the Related Art

A conventional digital camera generally has a liquid crystal monitor on the back for displaying a live view image (pass-through image) by sequentially converting a subject image that has passed through an image taking lens into electrical signals and supplying the signals to the liquid crystal monitor. The user can take an image by checking a subject image on a live view image displayed on the liquid crystal monitor.

When the user takes an image with the above-described camera, the liquid crystal monitor displays a live view image, and image data is saved in response to the user's shutter release operation while the live view image is being displayed. In that case, the liquid crystal monitor displays a still image that has been taken in response to the release operation for a certain period of time (for example, 1.5 seconds or 3 seconds) immediately after the image was taken for allowing the user to confirm the taken still image on the still image display (hereinafter, referred to as "post-view image"), and then switches the post-view image to the live view image.

A beginner or a user unfamiliar with the digital camera, however, cannot easily understand what the post-view image means.

Further, when a subject remaining stationary, such as a landscape, is photographed, a user can not easily notice that the live view image has switched to the post-view image. That has posed a problem in that the user is uncertain whether the image has been successfully photographed or not.

In that case, the user can recognize that the image has been successfully photographed by operating the camera to be in the playback mode in which a photographed image can be played and checking that the photographed image is played.

The invention described in Japanese Patent Application Laid-Open No. 2002-165116 is adapted to provide a camera with an easy turn dial, display film frames by the number of a plurality of frames on a liquid crystal screen on the back of the camera, display thumbnail images corresponding to the original image data stored in a memory card in a thumbnail image frames in the film frames, and position a specifying frame on a desired thumbnail image frame by having the user turn the dial to move the film frame or the specifying frame. The invention is also adapted to display the original image corresponding to the thumbnail image when the specifying frame is positioned on the thumbnail image, and be ready to record the original image when the specifying frame is positioned on a free region, and if an image is photographed when the specifying frame is positioned on the free region, insert the thumbnail image of the photographed image in the free region on which the specifying frame is positioned.

That is, the invention described in Japanese Patent Application Laid-Open No. 2002-165116 is adapted to allow the user to record, play and specify a frame to record by shifting the film frame or the specifying frame in accordance with the turning of the dial.

SUMMARY OF THE INVENTION

However, in the invention described in Japanese Patent Application Laid-Open No. 2002-165116, the dial for moving the film frame or the specifying frame has a function of switching the playback mode and the photographing mode. And, when the specifying frame is positioned on a free region (the camera is set to the photographing mode) and the shutter button is operated to take an image, the thumbnail image of the photographed image is inserted in the free region on which the specifying frame is positioned. As a result, the user can recognize that an image has been photographed and the image has been saved. However, in that case, the specifying frame is positioned on the thumbnail image of the photographed image and the camera is automatically set to the playback mode.

That is, the invention described in Japanese Patent Application Laid-Open No. 2002-165116 has a problem in that, although the camera is automatically switched to the playback mode after an image has been taken in the photographing mode so that the user can recognize the post-view image immediately after the image has been photographed, the user cannot photograph the next image until the user operates the dial and moves the film frame or the specifying frame to position the specifying frame on a free region again (until the user sets the camera to the photographing mode).

The present invention is adapted in view of the above-described circumstances. An object of the present invention is to provide an imaging device that allows the user to check the photographed image and also allows the user to intuitively recognize that an image has been successfully photographed and the photographed image has been normally saved so that the user can comfortably photographs an image and goes on photographing the next image without performing any special operation on the camera.

In order to achieve the above-described object, the imaging device according to an aspect of the present invention includes: an image pickup device that performs main photographing of a still image in response to input of a photographing request by a shutter button, while performing moving image photographing for displaying a live view image; a recording device that records a currently photographed image that is taken at the main photographing by the image pickup device in a recording medium; an image extracting device that extracts a predetermined number of images that have been photographed in the past from the recording medium; an animation creating device that creates an animation for showing that a reduced image of the currently photographed image is added to a reduced image of a last photographed image by using the currently photographed image that is taken at the main photographing and reduced images of the predetermined number of the extracted images; a display device that displays the still image or the moving image; and a display control device that displays the animation created by the animation creating device each time the main photographing is performed, while displaying the live view image that has been photographed by the image pickup device as a moving image on the display device.

Although the imaging device according to the aspect of the present invention usually displays the live view image, the imaging device can display an animation for allowing a user to intuitively recognize that an image has been successfully photographed and the photographed image has been saved each time the main photographing is performed. That allows the user to intuitively recognize that the photographed image has been saved and to go on photographing a next image without performing any special operation on the imaging device.

The length of the animation is several seconds that is the same as a conventional display period of the photographed image (for example, 1.5 seconds or three seconds). That length does not affect the next photographing.

In the imaging device according to the aspect of the present invention, the animation creating device can create an animation in which the reduced images of the past photographed images are displayed in a display region for first to (N−1)-th frames in a preset display region for N frames of reduced images in the display device, and the currently photographed image is gradually reduced and moved to be inserted in a display region for a N-th frame by using the currently photographed image that is taken at the main photographing as a background of the animation.

Thus, in the animation, reduced images of the past photographed images are displayed in a display region for first to (N−1)-th frames in a preset display region for N frames of reduced images in the display device, and the currently photographed image is gradually reduced and moved to be inserted in a display region for a N-th frame by using the currently photographed image that is taken at the main photographing as a background of the animation. Accordingly, the user can intuitively recognize that the photographed image has been saved, and go on photographing without performing any special operation.

In the imaging device according to the aspect of the present invention, the animation creating device can create an animation in which the reduced images of the past photographed images are displayed in a display region for first to (N−1)-th frames in a preset display region for N frames of reduced images in the display device, and the currently photographed image is gradually reduced and moved to be inserted in a display region for a N-th frame by using the live view image as a background of the animation.

This animation is different from the animation previously mentioned that is adapted to use the currently photographed image as a background of the animation in that the live view image is used as a background of the animation. This animation can also enables the user to intuitively recognize that the photographed image has been saved, and go on photographing without performing any special operation.

In the imaging device according to the aspect of the present invention, the image extracting device can include a classifying device that classifies the images that have been photographed in the past recorded in the recording medium, into a plurality of groups, and extracts a predetermined number of last images from images belonging to a group identical to that set at the current photographing among the images recorded in the recording medium.

The group set at the photographing may be a group that is classified for each photographing scene such as the portrait, the landscape and the like, a group that is classified for each photographing location, a group that can be classified for the photographed year, date, and time, and the like. The image extracting device is adapted to extract a predetermined number of the last images from the images belonging to the same group as that the current photographed image belongs. That allows the user to compare the currently photographed image with the last images in the same group that have been photographed in the past.

In the imaging device according to the aspect of the present invention, the display control device can display the currently photographed image for a certain period between displaying of the live view image and displaying of the animation. That allows the user to also check the photographed image before displaying the animation.

In the imaging device according to the aspect of the present invention, the image extracting device can extract N frames of the images that have been photographed in the past from the recording medium; and the animation creating device can create an animation in which reduced images of the N frames of the extracted images are displayed in a preset display region for N frames of reduced images on the display device, and then the reduced images are shifted by one frame to make a display region for a N-th frame free. Specifically, since the reduced images of the N frames of the past photographed images are displayed in the display region for the N frames on the display device, the currently photographed image cannot be added to the display region for the reduced images in that situation. Then, the imaging device is adapted to create an animation in which the reduced images are shifted by one frame to make the N-th frame free so that the reduced image of the currently photographed image can be added.

In the imaging device according to the aspect of the present invention, the image extracting device can extract less than N frames of the images when N frames of the images that have been photographed in the past cannot be extracted from the recording medium; and the animation creating device can create an animation in which the currently photographed image is gradually reduced and moved to be inserted into a display region next to a display region where a last reduced image of the displayed reduced images is displayed, while displaying reduced images of less than N frames of the extracted images in a preset display region for N frames of reduced images on the display device.

Specifically, the imaging device is adapted to create an animation in which the currently photographed image is gradually reduced and moved to be inserted into the display region next to the display region where the last reduced image is displayed when the preset display region for N frames of reduced images has a free region into which the reduced image of the currently photographed image is to be inserted.

In the imaging device according to the aspect of the present invention, the display control device can display the reduced images of predetermined number of images that are extracted by the image extracting device in a preset display region for N frames of reduced images on the display device, while displaying the live view image on the display device.

That allows the user to decide the composition and the main subject by viewing the reduced images of the images that have been photographed in the past.

In this case, the preset display region for N frames of reduced images on the display device can be superimposed on a part of a display region where the live view image is displayed, and the N frames of the reduced images can be superimposed on the live view image.

According to another aspect of the present invention, a photographed image display control method includes: a step of displaying a photographed moving image on a display device as a live view image, while photographing the moving image; a step of performing main photographing of a still image in response to input of a photographing request by a shutter button while the live view image is being displayed; a step of recording a currently photographed image that is taken at the main photographing in a recording medium; a step of extracting a predetermined number of images that have been photographed in the past from the recording medium; a step of creating an animation for showing that a reduced image of the currently photographed image is added to a reduced image of a last photographed image by using the currently photographed image that is taken at the main photographing and reduced images of the predetermined number of the extracted images; and a step of displaying the created animation instead of the live view image that is displayed on the display device each time when the main photographing is performed.

In the photographed image display control method of the aspect, the step of creating the animation can create an animation in which the reduced images of the past photographed images are displayed in a display region for first to (N−1)-th frames in a preset display region for N frames of reduced images in the display device, and the currently photographed image is gradually reduced and moved to be inserted in the display region for a N-th frame by using the currently photographed image that is taken at the main photographing as a background of the animation.

In the photographed image display control method of the aspect, the step of creating the animation can create an animation in which the reduced images of the past photographed images are displayed in a display region for the first to (N−1)-th frames in a preset display region for N frames of reduced images in the display device, and the currently photographed image is gradually reduced and moved to be inserted in the display region for the N-th frame by using the live view image as a background of the animation.

In the photographed image display control method of the aspect, the step of extracting the images can include a step of classifying the images that have been photographed un the past recorded in the recording medium, into a plurality of groups, and a predetermined number of last images are extracted from images belonging to a group identical to that set at the current photographing among the images recorded in the recording medium.

The photographed image display control method of the aspect can further include a step of displaying the currently photographed image for a certain period between displaying of the live view image and displaying of the animation.

In the photographed image display control method of the aspect, at the step of extracting the images, N frames of the images that have been photographed in the past can be extracted from the recording medium; and at the step of creating animation, an animation can be created, in which reduced images of the N frames of the extracted images are displayed in a preset display region for N frames of reduced images on the display device, and then the reduced images are shifted by one frame to make a display region for a N-th frame free.

In the photographed image display control method of the aspect, at the step of extracting the images, less than N frames of the images can be extracted when N frames of the images that have been photographed in the past cannot be extracted from the recording medium; and at the step of creating the animation, an animation can be created, in which the currently photographed image is gradually reduced and moved to be inserted into a display region next to a display region where a last reduced image of the displayed reduced images is displayed, while displaying reduced images of less than N frames of the extracted images in a preset display region for N frames of reduced images of the display device.

In the photographed image display control method of the aspect, the reduced images of the predetermined number of the extracted images can be displayed in a preset display region for N frames of reduced images on the display device, while the live view image on the display device is displayed.

In this case, the preset display region for N frames of reduced images on the display device can be superimposed on a part of a display region where the live view image is displayed, and the N frames of the reduced images are superimposed on the live view image.

the photographed image display control method according to any of the ninth to the fifteenth aspects has the display region for the preset N frames of the reduced images of the display device superimposed on a part of the display region where the live view image is displayed, and the N frames of the reduced images superimposed on the live view image.

According to the aspects of the present invention, although a live view image is normally displayed, each time the main photographing is performed, an animation for allowing a user to intuitively recognize that an image has been successfully photographed and the photographed image has been saved, is displayed in the place of the live view image. That allows the user to easily recognize that an image has been successfully photographed and the photographed image has been normally saved, without performing any special operation on the camera.

DETAILED DESCRIPTION OF THE PREFERRED EMBODIMENTS

Preferred embodiments of the imaging device and the photographed image display control method according to the present invention will be described below with reference to the attached drawings.

<Imaging Device>

Figure 1:
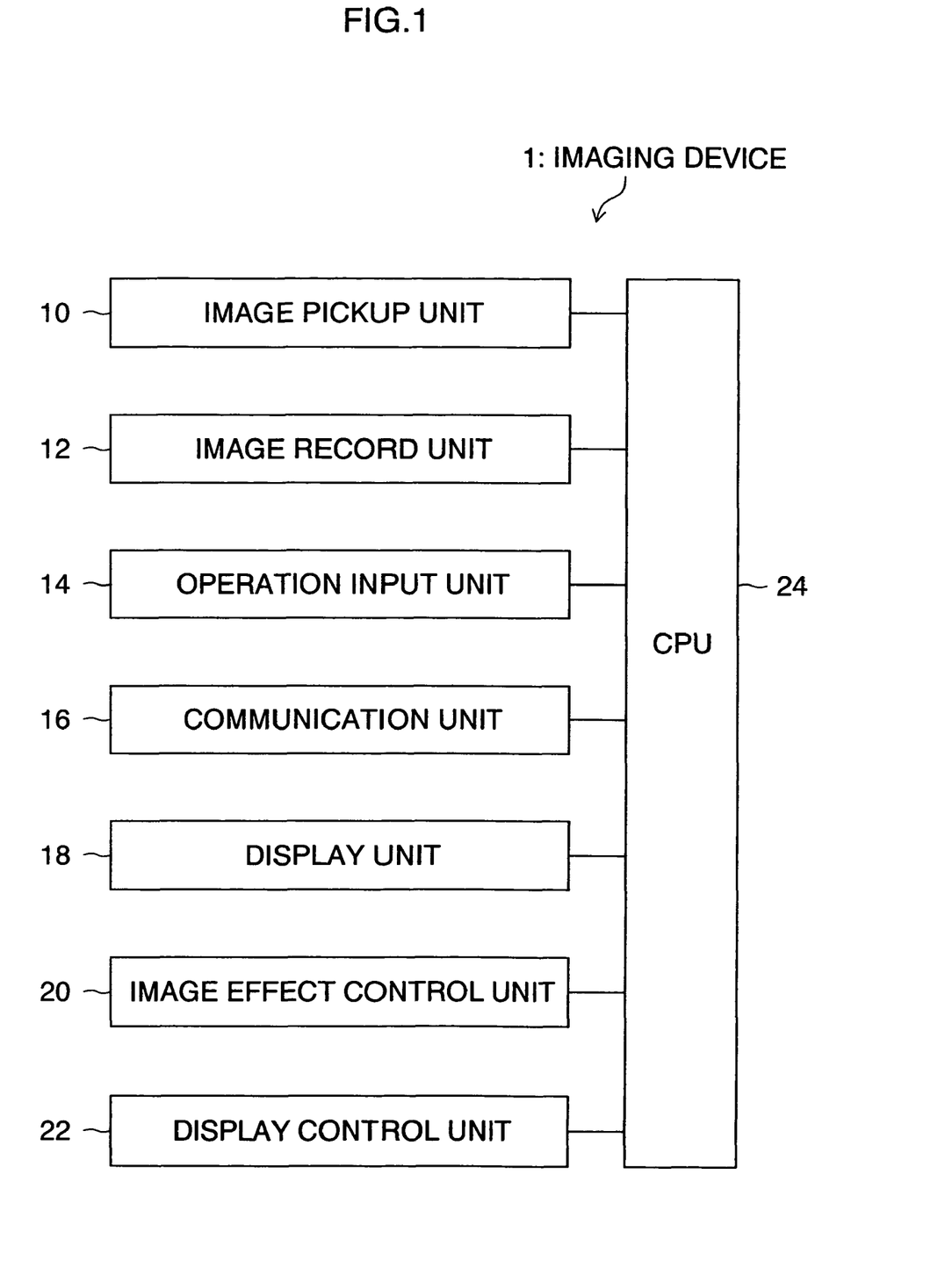
FIG. 1 is a main part block diagram showing an embodiment of an imaging device according to the present invention.

FIG. 1 is a main part block diagram showing an embodiment of an imaging device according to the present invention.

The imaging device 1 mainly includes an image pickup unit 10, an image record unit 12, an operation input unit 14, a communication unit 16, a display unit 18, an image effect control unit 20, a display control unit 22, and a central processing unit (CPU) 24.

The image pickup unit 10 converts an optical image incident from outside into image signals by using a lens, an image sensor and the like, and outputs the image signals. A flash or an illumination device that is used as a fill light in a dim condition or the like may be used as required.

The image pickup unit 10 may also include a signal processing unit. The signal processing performed at the signal processing unit differs depending on the output image signal format the operator requires. According to the photographing mode, the image pickup unit 10 performs offset correction, white balancing, color matrix processing, gradation conversion, contour enhancement, and compression on the image signals. The photographing mode includes a still image photographing mode, a moving image photographing mode, and a live view display mode which is at a preparation stage before the photographing modes. The still image photographing mode is further divided into a compressed recording mode and an uncompressed recording mode. The uncompressed recording mode is further divided into a RAW image recording mode and an uncompressed image format recording mode.

In the live view display mode (pass-through image mode) which is to be described in detail, the image pickup unit 10 is operated to serially output images, the output serial images are subjected to the signal processing at the signal processing unit and output in a suitable output format for the display format of the display unit 18. As a result, the live view images are serially displayed on the display unit 18.

The image record unit 12 records an input photographed image. The image record unit 12 may use an internal recording medium or an external recording medium such as a memory card, or both of them as a recording medium. Not only an image but also input or generated information (data) may also be recorded. The image record unit 12 can not only record but also read out the photographed image, transmit the read out images from the communication unit 16 via the CPU 24 and display the read out images on the display unit 18.

The operation input unit 14 includes operation switches for operating the imaging device 1 such as a power switch, a shutter button, a mode selection switch for switching between the photographing mode and the playback mode, a scene selection switch for selecting the photographing mode corresponding to a scene such as a portrait, a landscape, a night scene and the like, a zoom switch, a multifunction direction keys and the like. The user can operate the imaging device 1 by giving an instruction from the operation input unit 14 to the imaging device 1.

The communication unit 16 is a device for the imaging device 1 to communicate with outside. As the communication method, a wired communication, a wireless communication, an optical communication and the like may be used as required. The communication protocol may be selected as required. The communication unit 16 can not only transmit information to outside but also receive information from outside.

The display unit 18 is a liquid crystal display unit, an organic electroluminescence display unit or the like that is provided on the back of the imaging device 1 and displays a still image or a moving image. When the imaging device 1 is in the photographing mode and set to the still image photographing mode, the display unit 18 usually displays a serially photographed moving image (live view image), and each time when the still image is photographed in response to the operation on the shutter button, the display unit 18 displays the photographed image (still image) and the animation according to the present invention. In the moving image photographing mode, the display unit 18 displays the live view image.

When the imaging device 1 is set to the playback mode, the display unit 18 displays the still image or the moving image according to whether the image selected by a frame-by-frame playback or the like is a still image or a moving image.

The image effect control unit 20 has a function for superimposing the reduced images (thumbnail images) of the images of the last four frames that are recorded in the image record unit 12 on the live view image or the photographed image (post-view image); and a function for creating an animation according to the present invention by using the photographed image and the reduced images of four frames as materials for creating an animation (animation creating function). The image effect control unit 20 and the animation that is created by the animation creating function will be detailed later.

The image display control unit 22 performs display control including switching the live view image, the post-view image, the animation and the like to be displayed on the display unit 18.

The CPU 24 controls over respective units in response to the operator's instruction from the operation input unit 14 or the communication unit 16. Some or all of the functions of the image effect control unit 20 and the display control unit 22 may be achieved by software processing of the CPU 24.

<Image Effect Control Unit>

Figure 2:
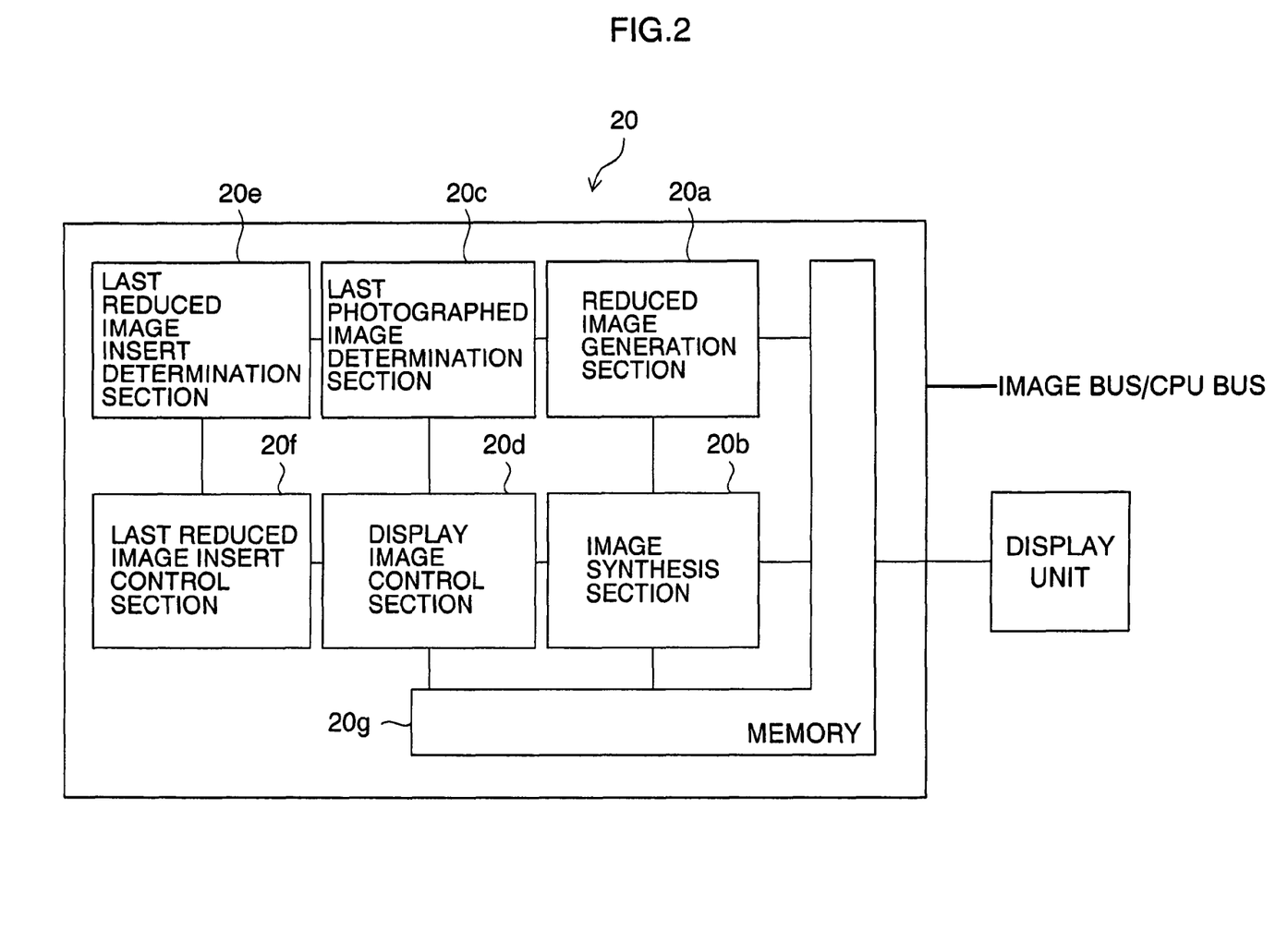
FIG. 2 is a functional block diagram showing an embodiment of an image effect control unit.

FIG. 2 is a functional block diagram showing an embodiment of the image effect control unit 20.

As shown in FIG. 2, an image bus and a CPU bus are connected with the control unit 20, which is adapted to obtain the images of the last four frames from the image record unit 12 via the bus or obtain the photographed image immediately after the photographing and before the recording.

Specifically, the image effect control unit 20 mainly includes a reduced image generation section 20a, an image synthesis section 20b, a last photographed image determination section 20c, a display image control section 20d, a last reduced image insert determination section 20e, a last reduced image insert control section 20f, and a working memory 20g.

The reduced image generation section 20a captures a predetermined number of (in this embodiment, four) the last images from images belonging to the group same as the group of the images to be photographed (the group set at the photographing) and creates the reduced images of the captured images. When the number of the images belonging to the same group is less than four, the reduced image generation section 20a captures the images less than four and creates the reduced images of the images. When the reduced images (thumbnail images) are included in an image file, the reduced images are extracted from the image file without creating a reduced image.

The group set at the photographing may be a group that can be classified for each photographing scene such as the portrait, the landscape and the like, a group that can be classified for each photographing location based on GPS information, a group that can be classified for the photographed year, date, and time, a group corresponding to a folder in the image record unit 12 that has been specified by the user (a folder in which image files for each photographer are stored, a folder in which images for each subject (such as flower, child, pet, and the like) are stored), and the like. Information on the group can be obtained from additional information added to the image file.

Figure 3:
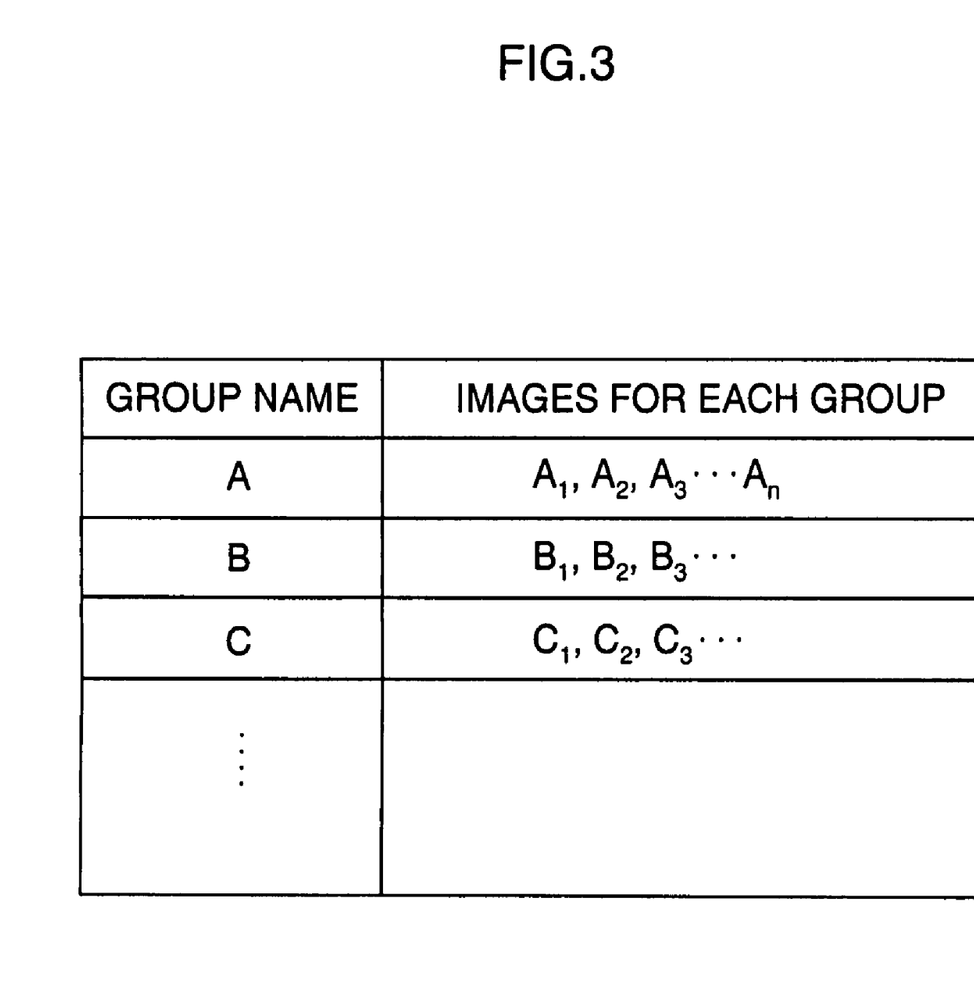
FIG. 3 is a table showing images in an image record unit classified into groups.

FIG. 3 is a table showing images in an image record unit 12 classified into groups. As shown in the figure, the group A includes images $A_1, A_2, A_3, \ldots, A_n$, for example. One image may belong to a plurality of groups.

It is assumed that the images $A_1, A_2, A_3, \ldots, A_n$ included in the group A are aligned in the ascending order of the photographed date and time. When the group A is set at the photographing, the reduced image generation section 20*a* generates or extracts the reduced images of the images $A_{n-3}$, $A_{n-2}$, $A_{n-1}$, and $A_n$.

The image synthesis section 20*b* synthesizes the live view image or the photographed image and the reduced images generated by the reduced image generation section 20*a*.

The last photographed image determination section 20*c* determines the image photographed last in the same group after (or may be before) the photographing. In the above-described example, the last photographed image determination section 20*c* determines the image $A_n$ as the last image. The last reduced image insert determination section 20*e* determines whether there is a region for displaying the reduced image of a newly photographed image at a specific position with respect to the reduced image of the last image photographed past (image $A_n$) or not.

Figure 6:
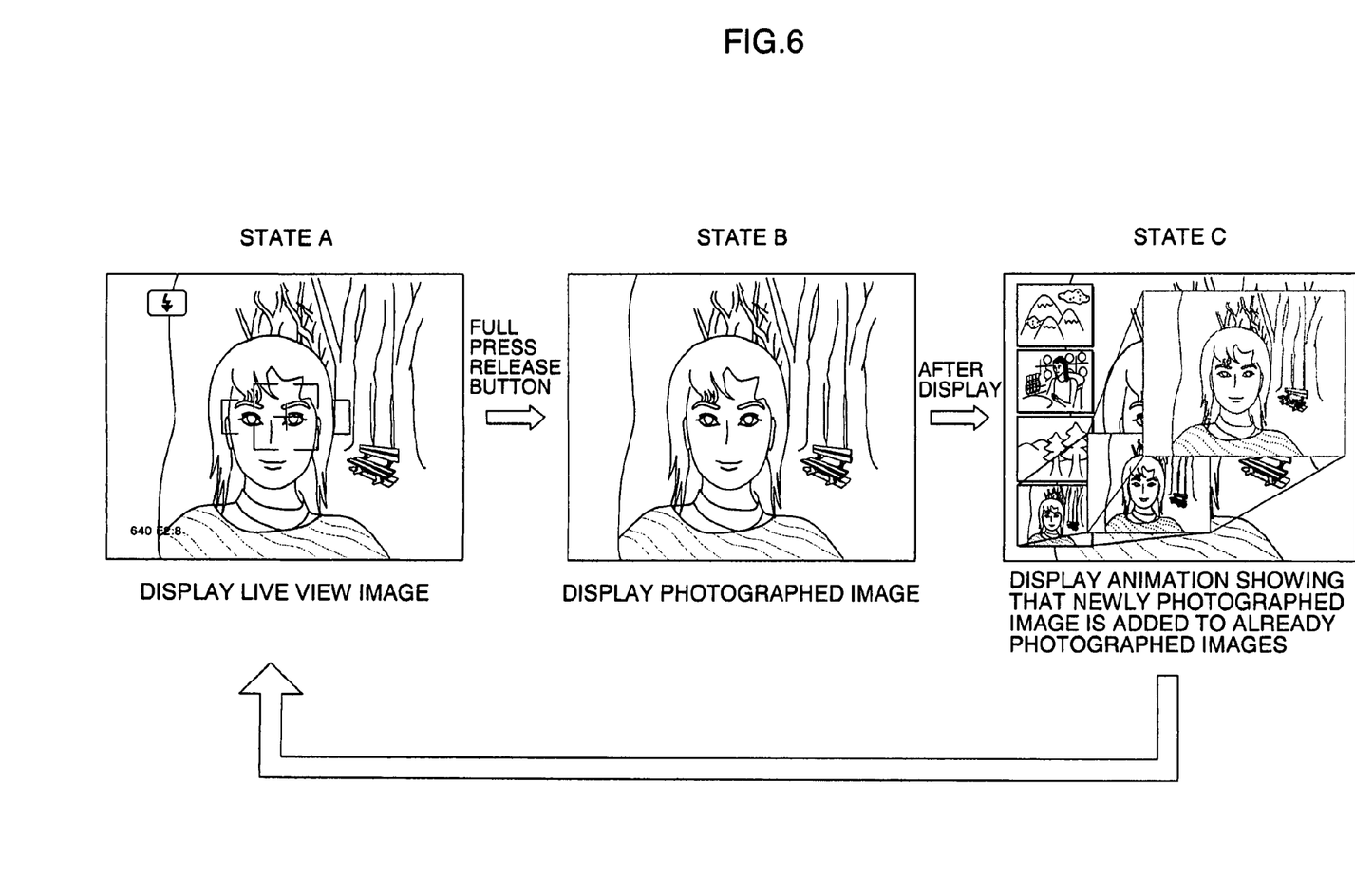
FIG. 6 is a diagram showing how an image displayed on a display unit transitions according to the first embodiment.

Specifically, the screen of the display unit 18 has a display region for displaying four frames of the reduced images in a line (see State C in FIG. 6). When four or more frames of images are in the same group, the last reduced image insert determination section 20*e* determines that there is no region for displaying the reduced image of the newly photographed image. When less than four frames of reduced images are in the same group, the last reduced image insert determination section 20*e* determines that there is a region for displaying the reduced image of the newly photographed image.

Figure 4:
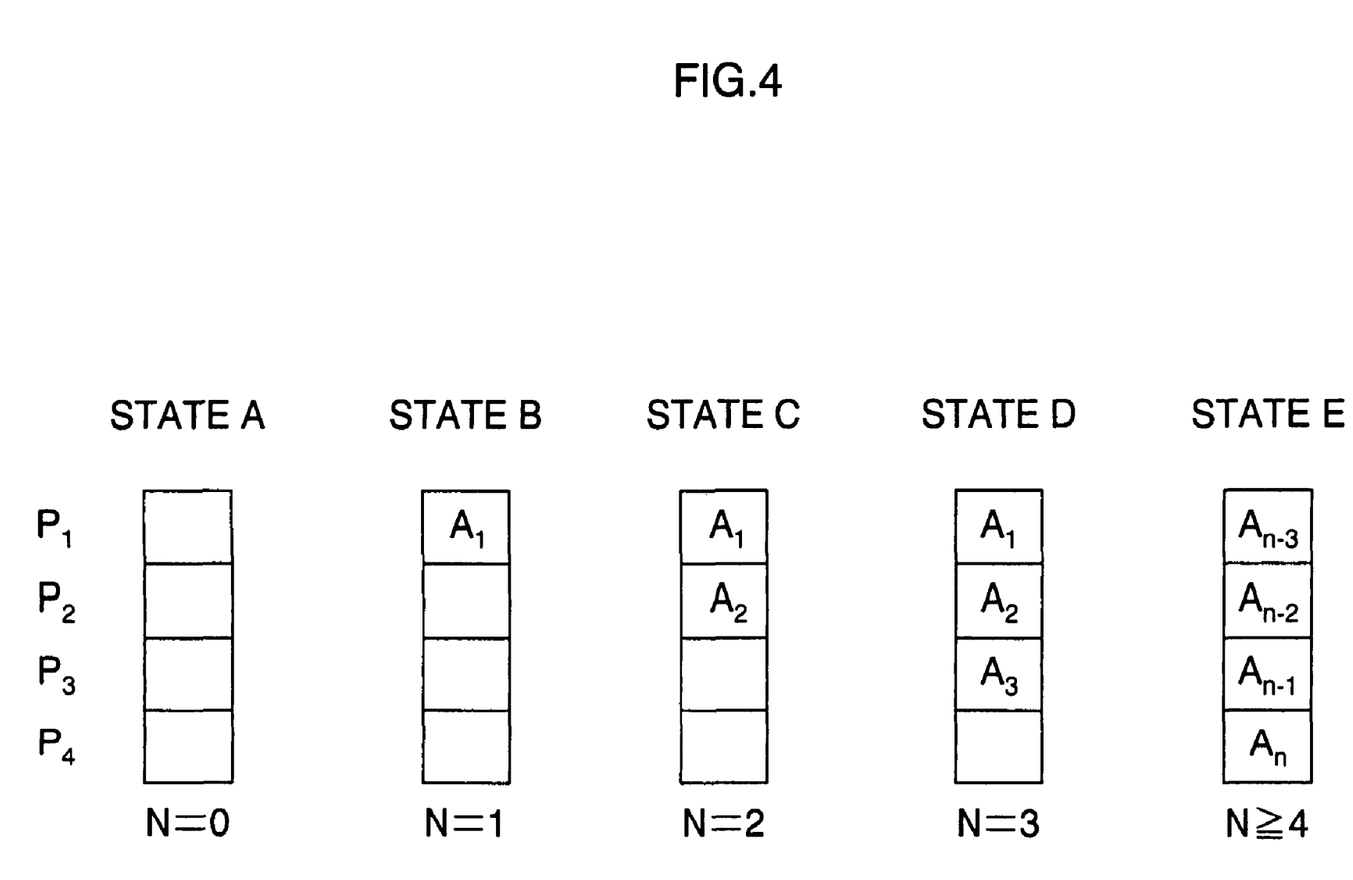
FIG. 4 is a diagram showing a relationship between the number of frames N of images belonging to the same group and images to be inserted into display regions $P_1$, $P_2$, $P_3$, and $P_4$ of four frames of the reduced images or a free region.

FIG. 4 shows a relationship between the number of frames N of images belonging to the same group and images to be inserted into display regions $P_1$, $P_2$, $P_3$, and $P_4$ of four frames of the reduced images or a free region.

As shown in State E in FIG. 4, when the number of the frames N belonging to the same group is four or more (N≧4), the reduced images of the images $A_{n-3}$, $A_{n-2}$ $A_{n-1}$, and $A_n$ can be placed in the display regions $P_1$ to $P_4$, respectively, and there is no free region. When the number of frames N belonging to the same group is less than four (N<4), there is one or more free regions.

It is assumed that an image is newly photographed. When the display regions $P_1$ to $P_4$ has one or more free regions, the last reduced image insert control section 20*f* creates a first animation in which the photographed image is gradually reduced as moved to be inserted into the free region next to the last reduced image. When the display regions $P_1$ to $P_4$ has no free region, the last reduced image insert control section 20*f* creates a second animation in which the aligned reduced images are shifted in order to make the display region $P_4$ free.

The display image control section 20*d* displays the image synthesized by the image synthesis section 20*b* on the display unit 18, and also displays the first animation or the first animation and the second animation created by the last reduced image insert control section 20*f* on the display unit 18.

FIRST EMBODIMENT

Figure 5:
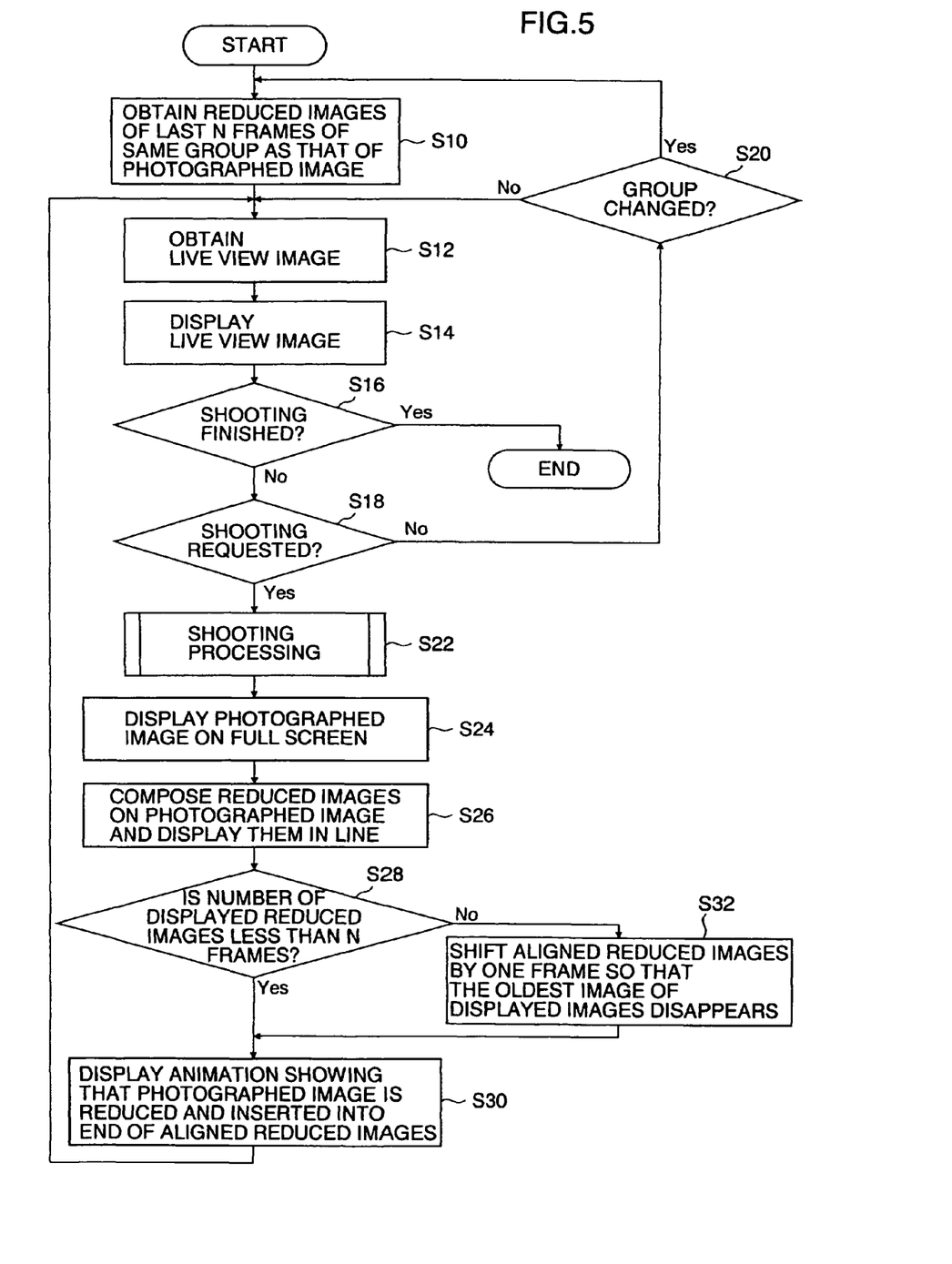
FIG. 5 is a flowchart showing a first embodiment of a photographed image display control method according to the present invention.

FIG. 5 is a flowchart showing the first embodiment of the photographed image display control method according to the present invention. FIG. 6 is a diagram showing how an image to be displayed on the display unit 18 transitions according to the first embodiment.

As shown in FIG. 5, when an image is to be photographed in the still image. photographing mode, N frames (in this embodiment, four frames) of the last images are obtained from the images belonging to the group the same as that of the image to be photographed (step S10).

A moving image is photographed and the live view image is obtained (step S12), and the live view image is displayed on the display unit 18 (step S14, State A in FIG. 6).

Whether an instruction to end the photographing is input while the live view image is being displayed (power off, switching to the playback mode, and the like) or not is determined (step S16). When the instruction to end the photographing is input, the processing in the still image photographing mode ends.

If the instruction to end the photographing is not input, whether an instruction to photograph an image is input or not (whether the shutter button is fully depressed or not) is determined (step S18).

If the instruction to photograph an image is not input, the operation proceeds to step S20 and whether the groups have been changed or not is determined. It is assumed that the groups are classified for photographing scenes such as the portrait, the landscape and the like, or classified for the photographed date and time. In this case, when the scene selection for switching the photographing scenes is performed or when the date moves onto the next date, it is determined that the group has been changed. When it is determined that the group has been changed, the operation proceeds to step S10. When it is determined that the group has not been changed, the operation proceeds to step S12.

On the other hand, when it is determined that the instruction to photograph an image is input at step S18, photographing processing for photographing a still image, performing various types of signal processing on the photographed image, and recording the image in the image record unit 12 is performed (step S22).

The processed photographed image is displayed on the full screen of the display unit 18 in parallel with the above-described photographing processing (step S24, State B in FIG. 6). The photographed image is displayed for a predetermined period (for example, one second) as the post-view image.

Subsequent to displaying the post-view image, the reduced images obtained at step S10 are superimposed in a line on the photographed image (step S26, State C in FIG. 6).

Next, whether the number of the frames of the reduced images obtained at step S10 is less than N or not is determined (step S28). When the number of the frames of the obtained reduced images is less than N, there is a free region in the display region for the reduced images as shown in FIG. 4. In that case, an animation (the first animation), in which the photographed image is gradually reduced as moved to be inserted into the last of the aligned reduced images, is displayed (step S30, State C in FIG. 6).

On the other hand, On the other hand, when the number of the frames of the obtained reduced images is N or more, there is no free region in the display region for the reduced images as shown in FIG. 4. In that case, an animation (the second animation), in which the aligned reduced images are shifted by one frame so that a frame of the oldest image in the displayed line disappears, is displayed (step S32). Then, the operation proceeds to step S30, and the first animation is displayed.

When the display of the first animation at step S30 ends (the display, in which a photographed image is added to the past reduced images, ends), the operation proceeds to step S12 where the live view image is displayed again and the next photographing is enabled.

Step S24 shown in FIG. 5 may be omitted. In that case, the photographed image (post-view image) shown in State B in FIG. 6 is not displayed. As shown in State C in FIG. 6, since the photographed image is displayed as a background image of the animation, the user can check the photographed image.

In place of the live view image, a synthesized display of the photographed image and the reduced images of the past images as well as the animation, in which the newly photographed image is added to the past reduced images, are displayed each time the still image is photographed. That allows the user to intuitively recognize that the image has been successfully photographed and the photographed image has been normally saved.

Figure 7:
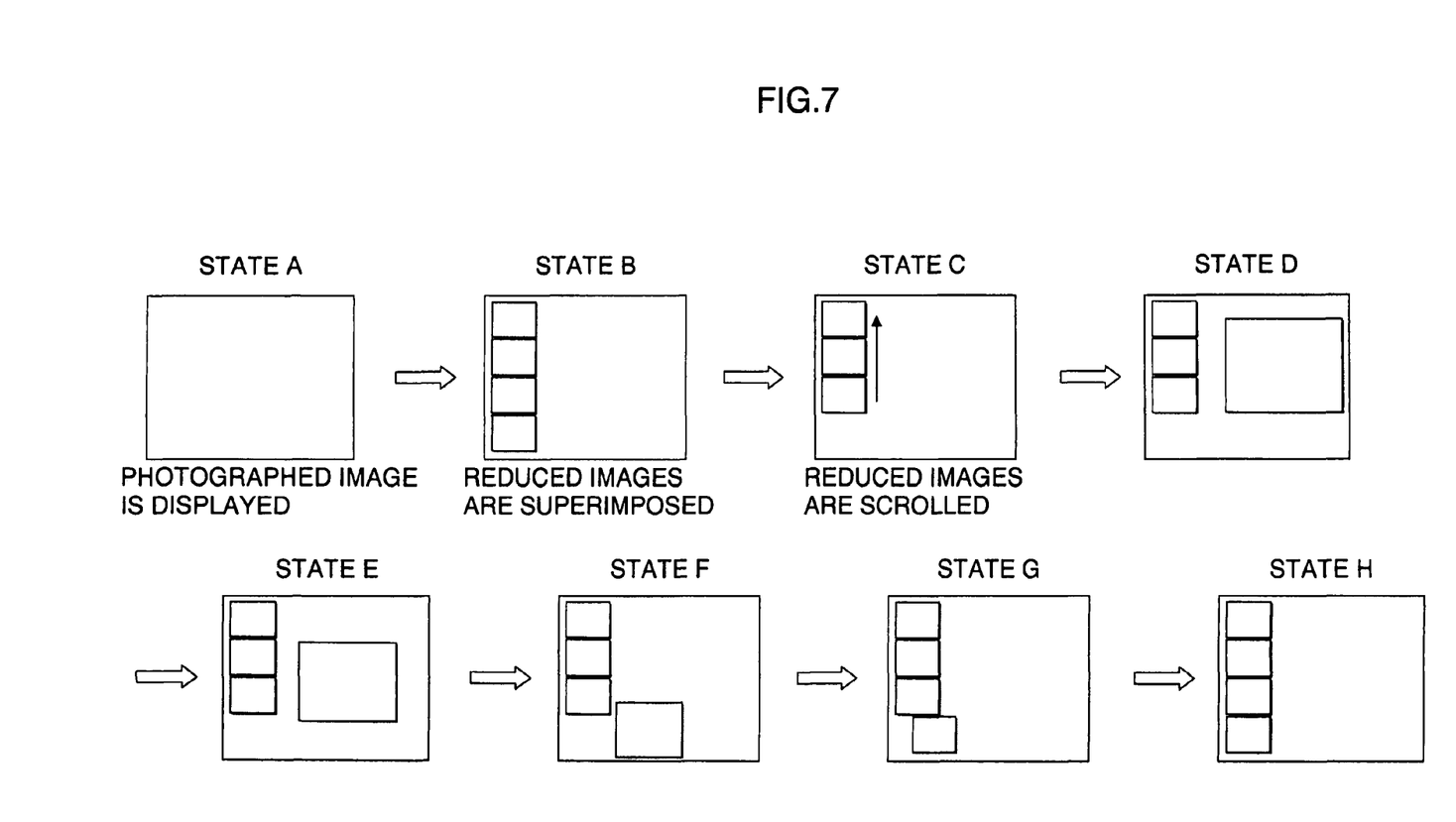
FIG. 7 is a diagram showing how an image displayed on the display unit transitions according to the first embodiment in more detail.

FIG. 7 is a diagram showing how a displayed image transitions since the photographed image (post-view image) is displayed until the animation is displayed.

As shown in State A in FIG. 7, after the photographed image is displayed, the past reduced images are superimposed on the photographed image (State B in FIG. 7). Then, the second animation, in which aligned reduced images are scrolled by one frame for the purpose of reserving a free region in the display region for the reduced images, is displayed (State C in FIG. 7).

Next, as shown in States D to H in FIG. 7, the first animation, in which the photographed image is gradually reduced as moved so that the reduced image of the newly photographed image is inserted into the obtained free region, is displayed.

Although the first animation is displayed after the second animation is displayed in the embodiment, the first animation and the second animation may be displayed at the same time. As described above, when the number of the past reduced images is less than N, the first animation as shown in State C in FIG. 7 is not displayed.

SECOND EMBODIMENT

Figure 8:
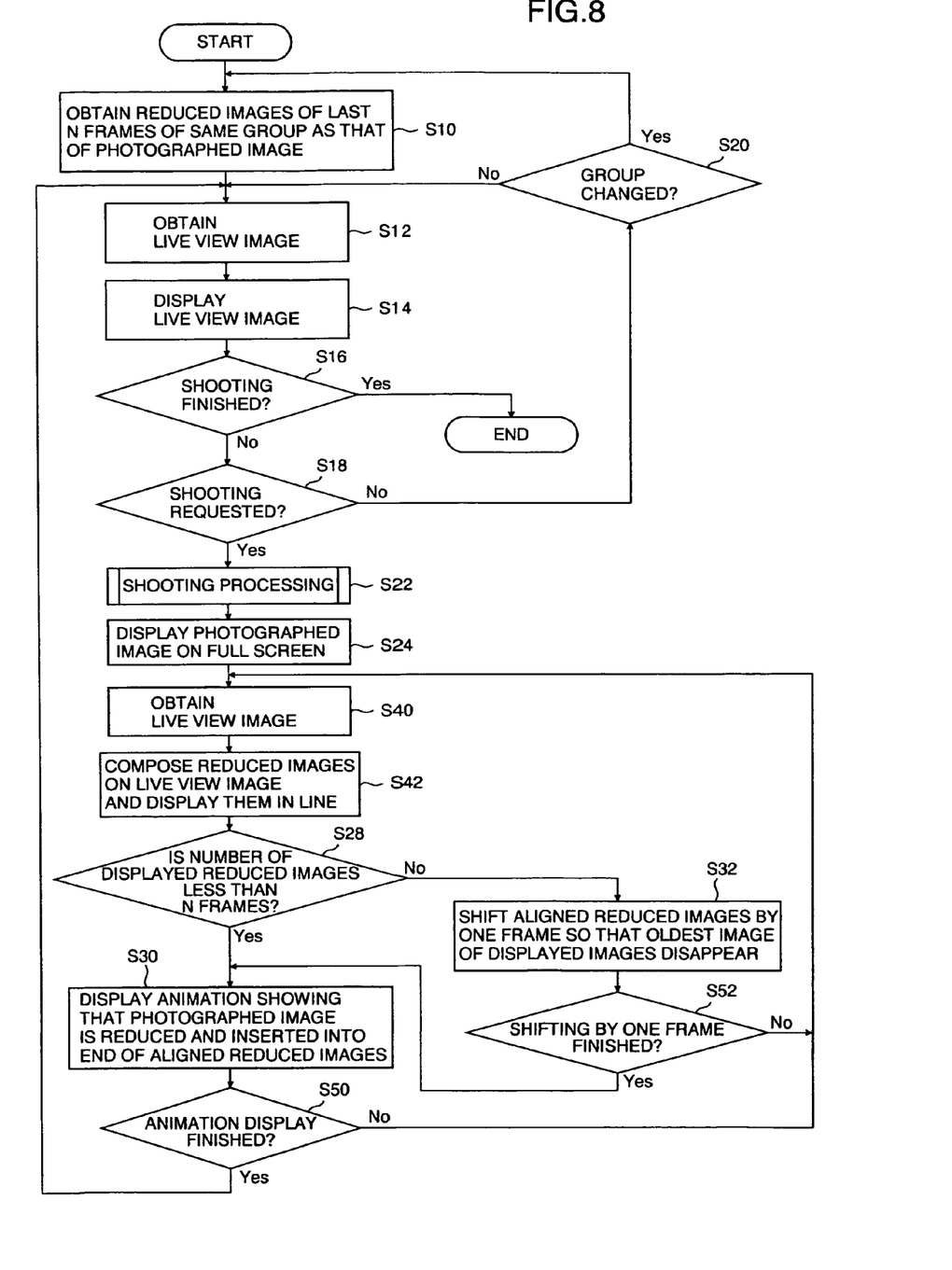
FIG. 8 is a flowchart showing a second embodiment of the photographed image display control method according to the present invention.

FIG. 8 is a flowchart showing a second embodiment of the photographed image display control method according to the present invention. The steps the same as those in the first embodiment shown in FIG. 5 are designated by the same step numbers and their detailed description will be omitted.

The second embodiment shown in FIG. 8 is different from the first embodiment in that processing at step S40 and step S42 is performed instead of the processing at step S26 of the first embodiment shown in FIG. 5, and that processing at step S50 and step S52 is added.

Specifically, the second embodiment is different from the first embodiment in that the live view image is used as a background image of the animation instead of using the photographed image as the background image of the animation when the animation is displayed after the post-view image is displayed.

As shown in FIG. 8, when the display of the post-view image at step S24 ends, obtaining of the live view image is started (step S40). Then, the reduced images obtained at step S10 are vertically aligned and superimposed on the live view image (step S42).

At step S50, whether the animation, in which the photographed image is gradually reduced as moved to be inserted into the end of the aligned reduced images, has ended or not is determined. If the animation has not ended, the operation proceeds to step S40 and the live view image is obtained. As the result, the background image of the animation is the live view image.

At step S52, whether the animation in which the aligned reduced images are shifted by one frame so that a frame of the oldest image displayed in the line disappears, has ended or not is determined. If the animation has not ended, the operation proceeds to step S40 and the live view image is obtained. As the result, the background image of the animation is the live view image as described above.

THIRD EMBODIMENT

Figure 9:
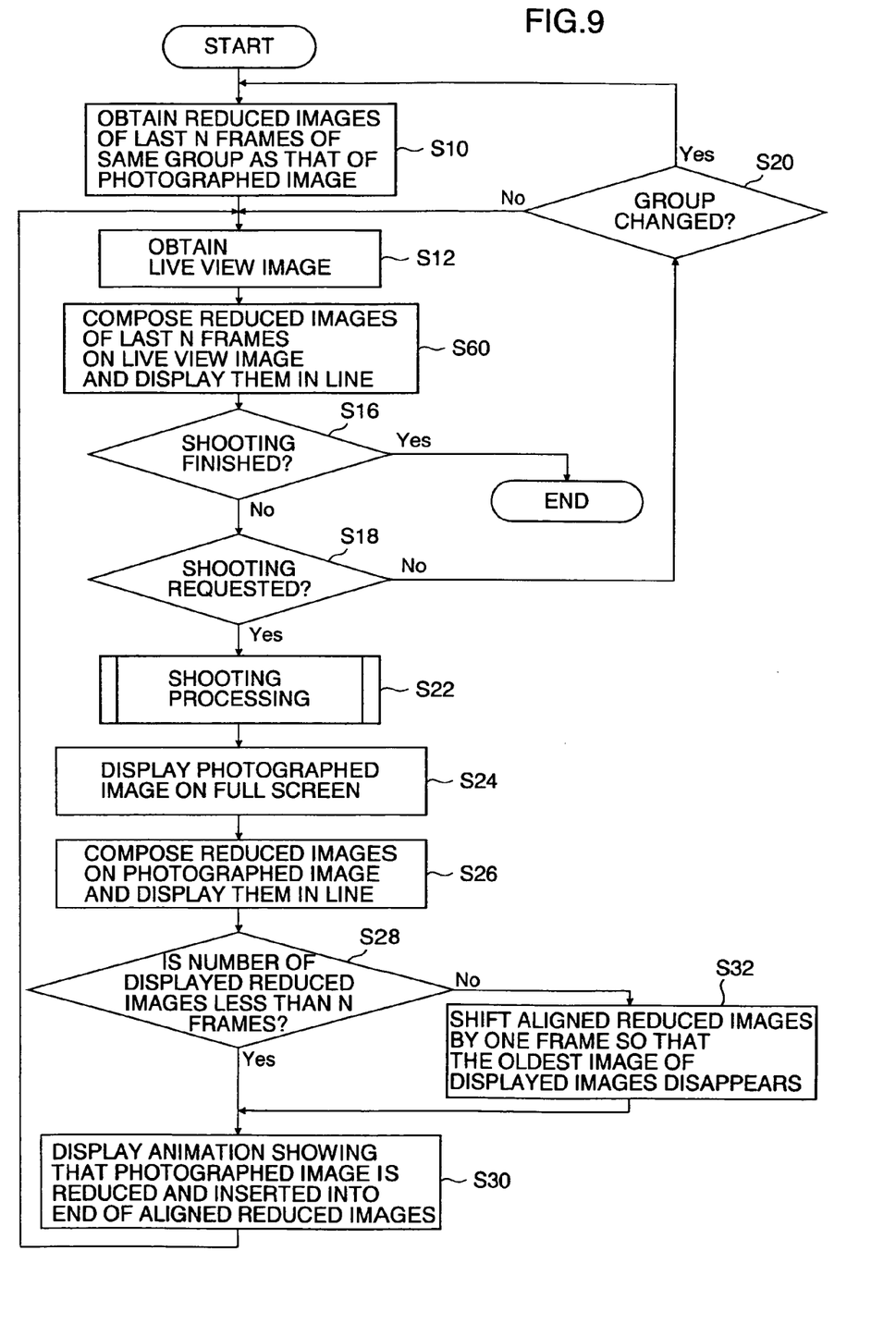
FIG. 9 is a flowchart showing a third embodiment of the photographed image display control method according to the present invention.
Figure 10:
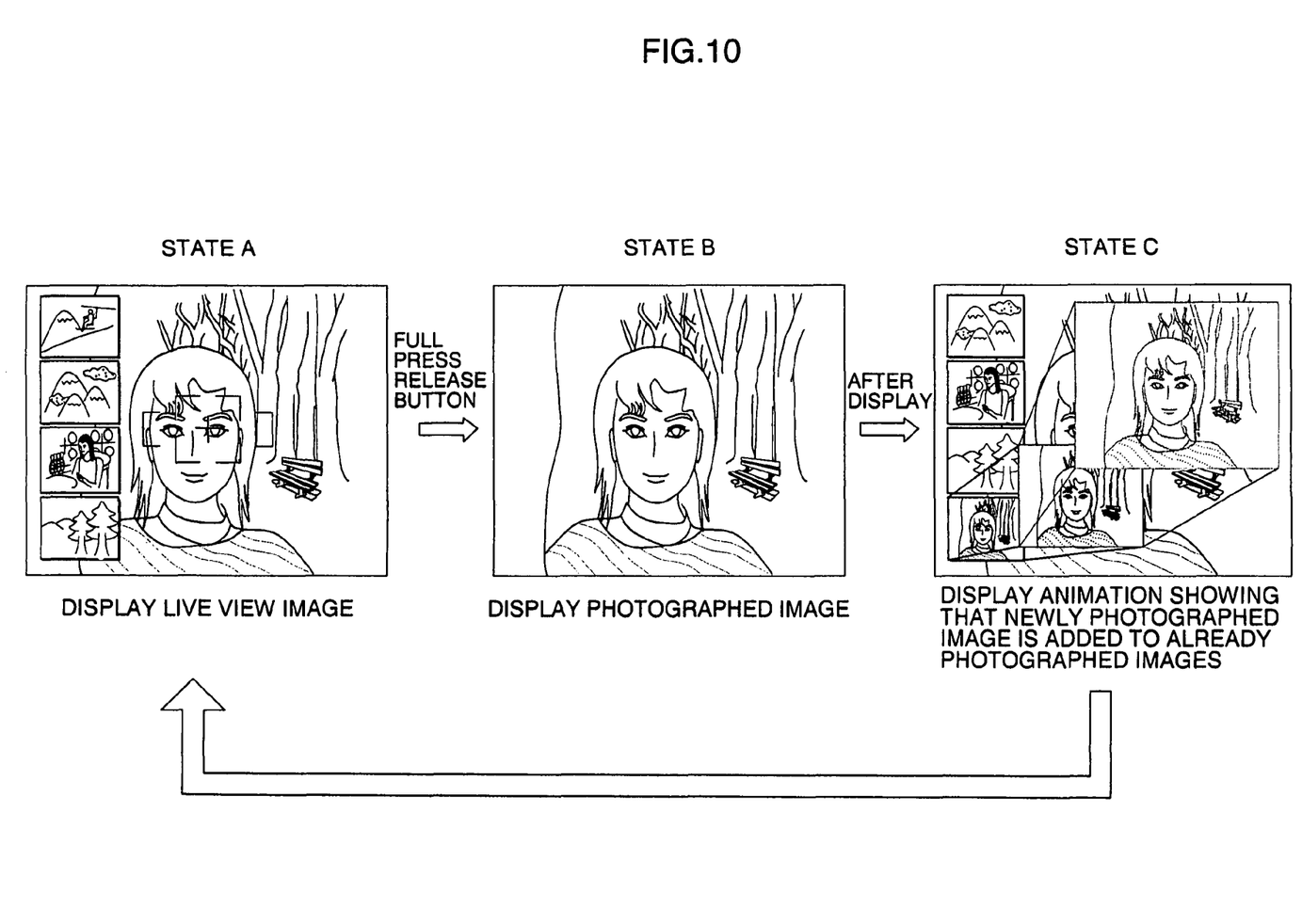
FIG. 10 is a diagram showing how an image displayed on the display unit transitions according to the third embodiment.

FIG. 9 is a flowchart showing the third embodiment of the photographed image display control method according to the present invention. FIG. 10 is a diagram showing how an image to be displayed on the display unit 18 transitions according to the third embodiment. The steps the same as those in the first embodiment shown in FIG. 5 are designated by the same step numbers and their detailed description will be omitted.

The third embodiment shown in FIG. 9 is different from the first embodiment in that processing at step S60 is performed instead of the processing at step S14 of the first embodiment shown in FIG. 5.

Specifically, N frames of the reduced images obtained at step S10 are superimposed on the live view image at step S60 of the third embodiment (State A in FIG. 10), while only the live view image is displayed on the display unit 18 at step S14 of the first embodiment (State A in FIG. 6).

That allows the user to decide the composition and the main subject by viewing the reduced images of the images that have been photographed in the past.

FOURTH EMBODIMENT

Figure 11:
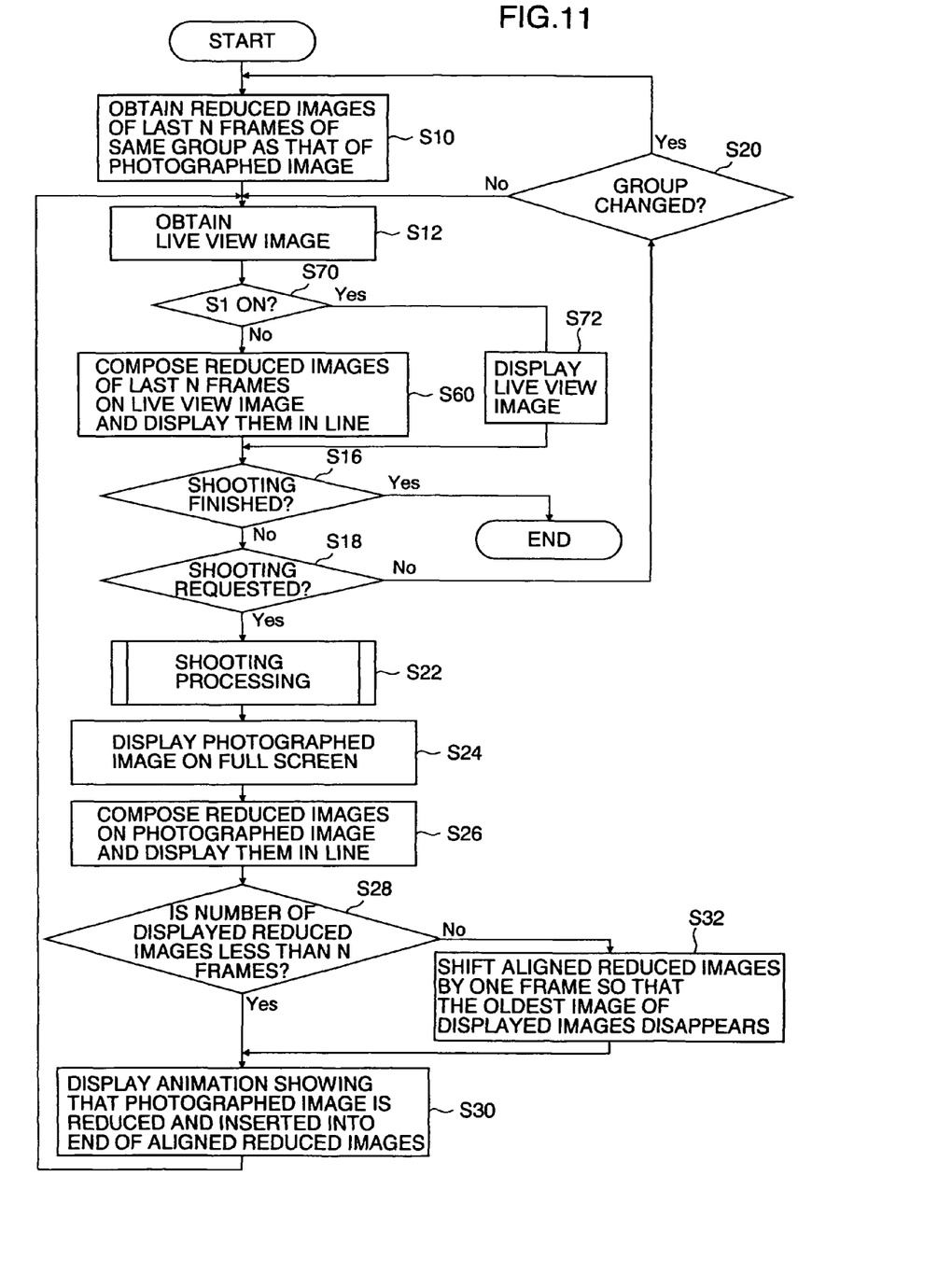
FIG. 11 is a flowchart showing a fourth embodiment of the photographed image display control method according to the present invention.

FIG. 11 is a flowchart showing the fourth embodiment of the photographed image display control method according to the present invention. The steps the same as those in the third embodiment shown in FIG. 9 are designated by the same step numbers and their detailed description will be omitted.

The fourth embodiment shown in FIG. 11 is different from the third embodiment shown in FIG. 9 in that processing at step S70 and step S72 are added.

Specifically, whether the shutter button is half depressed for requesting photographing preparing operations such as autofocus (AF), automatic exposure (AE) and the like (S1 is ON) or not is determined at step S70, and if S1 is ON, the superimposition of the reduced images is forbidden so that only the live view image is displayed in the fourth embodiment (step S72), while the N frames of the reduced images are superimposed on the live view image in the third embodiment.

That allows the user to check the whole photographing range immediately before photographing, without any part of the range hidden by the reduced images.

OTHER EMBODIMENTS

Although the vertically aligned reduced images are displayed in the screen of the display unit 18 in the fourth embodiment, the reduced images may be horizontally aligned and displayed. The number of the columns and the number of the frames of the reduced images are not limited to those described in the embodiment.

When the screen of the display unit 18 is a wide screen, a display region for displaying the live view image and the post-view image and a display region for displaying a plurality of reduced images are separated so that the reduced images are not superimposed on the live view image or the like.

Further, in these embodiments, when N or more frames of past images are present, N frames of the reduced images of the past images are displayed in the display region for N frames of the reduced images. And, when an image is newly photographed, the past reduced images are shifted by one frame to make a free region of one frame in the display region for the reduced images so that a reduced image of the new image can be added. The present invention, however, is not limited to that and (N−1) frames of the past reduced images may be displayed in advance so that the display region for the reduced images is freed for one frame.

Further, when a photographing mode is set in a high-sensitivity double exposure photographing mode in which a high sensitivity photographing for photographing an image at high sensitivity without a flash light and a flash photographing for photographing an image with a flash light in response to a single input of an instruction for photographing, an animation, in which two photographed images that have been photographed without a flash light and with a flash light in succession are added to the past reduced images in order, is displayed. When a consecutive photographing mode for consecutively photographing a plurality of images is set, an animation, in which the images are added to the past reduced images in order, is displayed.

It is needless to say that the present invention is not limited to the above-described examples and any improvements and modification can be made without departing the spirit of the present invention.

What is claimed is:

1. An imaging device comprising:
    an image pickup device that performs main photographing of a still image in a response to an input of a photographing request, while performing moving image photographing for displaying a live view image;
    a recording device that records a currently photographed image that is taken at a main photographing by the image pickup device in a recording medium;
    an image extracting device that extracts a predetermined number of images that have been photographed in a past from the recording medium;
    an animation creating device that creates an animation for showing that a reduced image of the currently photographed image is added to a reduced image of a last photographed image by using the currently photographed image that is taken at the main photographing and reduced images of the predetermined number of the extracted images;
    a display device that displays the still image or the moving image; and
    a display control device that displays the animation created by the animation creating device each time the main photographing is performed, while displaying the live view image that has been photographed, by the image pickup device as a moving image on the display device,
    wherein the animation creating device creates an animation in which the reduced images of the past photographed images are displayed in a display region for first to (N−1)-th frames in a preset display region for N frames of reduced images in the display device, and the currently photographed image is gradually reduced and moved to be inserted in a display region for an N-th frame by using the currently photographed image that is taken at the main photographing as a background of the animation,
    wherein the display control device displays the reduced images of predetermined number of images that are extracted by the image extracting device in a preset display region for the N frames of reduced images on the display device, while displaying the live view image on the display device, and
    wherein the preset display region for N frames of reduced images on the display device is superimposed on a part of a display region where the live view image is displayed, and the N frames of the reduced images are superimposed on the live view image.

2. The imaging device according to claim 1, wherein the image extracting device comprises a classifying device that classifies the images that have been photographed in the past recorded in the recording medium, into a plurality of groups, and extracts a predetermined number of last images from images belonging to a group identical to that set at the current photographing among the images recorded in the recording medium.

3. The imaging device according to claim 1, wherein the display control device displays the currently photographed image for a certain period between displaying of the live view image and displaying of the animation.

4. The imaging device according to claim 1, wherein the image extracting device extracts N frames of the images that have been photographed in the past from the recording medium, and
    wherein the animation creating device creates an animation in which reduced images of the N frames of the extracted images are displayed in a preset display region for the N frames of reduced images on the display device, and then the reduced images are shifted by one frame to make a display region for the N-th frame free.

5. The imaging device according to claim 1, wherein the image extracting device extracts less than N frames of the images when N frames of the images that have been photographed in the past cannot be extracted from the recording medium, and
    wherein the animation creating device creates an animation in which the currently photographed image is gradually reduced and moved to be inserted into a display region next to a display region where a last reduced image of the displayed reduced images is displayed, while displaying reduced images of less than N frames of the extracted images in a preset display region for the N frames of reduced images on the display device.

6. The imaging device according to claim 1, wherein, in said animation, said currently photographed image overlaps with said reduced images of the predetermined number of the extracted images.

7. The imaging device according to claim 1, wherein, in said animation, the display device displays a plurality of ones of said currently photographed image.

8. The imaging device according to claim 7, wherein, one of the plurality of ones of said currently photographed image overlaps with said reduced images of the predetermined number of the extracted images.

9. The imaging device according to claim 1, wherein, in said animation, said currently photographed image moves across the display region for the first to (N−1)-th frames of the reduced images of the past photographed images.

10. An imaging device, comprising:
    an image pickup device that performs main photographing of a still image in a response to an input of a photographing request, while performing moving image photographing for displaying a live view image;
    a recording device that records a currently photographed image that is taken at a main photographing by the image pickup device in a recording medium;
    an image extracting device that extracts a predetermined number of images that have been photographed in a past from the recording medium;
    an animation creating device that creates an animation for showing that a reduced image of the currently photographed image is added to a reduced image of a last photographed image by using the currently photographed image that is taken at the main photographing and reduced images of the predetermined number of the extracted images;

a display device that displays the still image or the moving image; and a display control device that displays the animation created by the animation creating device each time the main photographing is performed, while displaying the live view image that has been photographed by the image pickup device as a moving image on the display device, wherein the animation creating device creates an animation in which the reduced images of the past photographed images are displayed in a display region for first to (N−1)-th frames in a preset display region for N frames of reduced images in the display device, and the currently photographed image is gradually reduced and moved to be inserted in a display region for an N-th frame by using the live view image as a background of the animation.

11. A photographed image display control method, comprises:

displaying a photographed moving image on a display device as a live view image, while photographing the moving image;

performing a main photographing of a still image in response to an input of a photographing request while the live view image is being displayed;

recording a currently photographed image that is taken at the main photographing in a recording medium;

extracting a predetermined number of images that have been photographed in a past from the recording medium;

creating an animation for showing that a reduced image of the currently photographed image is added to a reduced image of a last photographed image by using the currently photographed image that is taken at the main photographing and reduced images of the predetermined number of the extracted images; and displaying the created animation instead of the live view image that is displayed on the display device each time when the main photographing is performed, wherein the creating the animation creates an animation in which the reduced images of the past photographed images are displayed in a display region for first to (N−1)-th frames in a preset display region for N frames of reduced images in the display device, and the currently photographed image is gradually reduced and moved to be inserted in the display region for an N-th frame by using the currently photographed image that is taken at the main photographing as a background of the animation, wherein the reduced images of predetermined number of images that are extracted by the image extracting device in a preset display region for the N frames of reduced images on the display device, while displaying the live view image on the display device, and wherein the preset display region for the N frames of reduced images on the display device is superimposed on a part of a display region where the live view image is displayed, and the N frames of the reduced images am superimposed on the live view image.

12. The photographed image display control method according to claim 11, wherein the extracting the images comprises classifying the images that have been photographed in the past recorded in the recording medium, into a plurality of groups, and a predetermined number of last images are extracted from images belonging to a group identical to that set at the current photographing among the images recorded in the recording medium.

13. The photographed image display control method according to claim 11, further comprising displaying the currently photographed image for a certain period between displaying of the live view image and displaying of the animation.

14. The photographed image display control method according to claim 11, wherein at the extracting the images, N frames of the images that have been photographed in the past are extracted from the recording medium; and at the creating animation, an animation is created, in which reduced images of the N frames of the extracted images are displayed in a preset display region for the N frames of reduced images on the display device; and then the reduced images are shifted by one frame to make a display region for the N-th frame free.

15. The photographed image display control method according to 11, wherein at the extracting the images, less than N frames of the images are extracted when N frames of the images that have been photographed in the past cannot be extracted from the recording medium, and wherein at the creating the animation, an animation is created, in which the currently photographed image is gradually reduced and moved to be inserted into the display region that is located next to a display region where a last reduced image of the displayed reduced images is displayed, while displaying reduced images of less than N frames of the extracted images in a preset display region for the N frames of reduced images of the display device.

16. A photographed image display control method, comprises:

displaying a photographed moving image on a display device as a live view image, while photographing the moving image;

performing a main photographing of a still image in response to an input of a photographing request while the live view image is being displayed;

recording a currently photographed image that is taken at the main photographing in a recording medium;

extracting a predetermined number of images that have been photographed in a past from the recording medium;

creating an animation for showing that a reduced image of the currently photographed image is added to a reduced image of a last photographed image by using the currently photographed image that is taken at the main photographing and reduced images of the predetermined number of the extracted images; and displaying the created animation instead of the live view image that is displayed on the display device each time when the main photographing is performed, wherein the creating the animation creates an animation in which the reduced images of the past photographed images are displayed in a display region for first to (N−1)-th frames in a preset display region for N frames of reduced images in the display device, and the currently photographed image is gradually reduced and moved to be inserted in the display region for an N-th frame by using the live view image as a background of the animation.

* * * * *